(12) United States Patent
Ramanathan et al.

(10) Patent No.: US 7,617,243 B2
(45) Date of Patent: Nov. 10, 2009

(54) INTEGRATED ADDRESS BOOK BASED ON DEPARTMENTAL HIERARCHY

(75) Inventors: Rajesh Ramanathan, Redmond, WA (US); Kenzaburo Tamaru, Tokyo (JP); Koichi Nakajima, Kawasaki (JP); Kristian L. M. Andaker, Redmond, WA (US); Michael Anthony Faoro, North Bend, WA (US); Yasuhiko Mori, Tokyo (JP); Yusuke Bou, Tokyo (JP); Taketoshi Yoshida, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 400 days.

(21) Appl. No.: 11/439,803

(22) Filed: May 24, 2006

(65) Prior Publication Data

US 2007/0276846 A1 Nov. 29, 2007

(51) Int. Cl.
*G06F 17/30* (2006.01)
(52) U.S. Cl. .................................. 707/104.1
(58) Field of Classification Search ........... None
See application file for complete search history.

(56) References Cited

U.S. PATENT DOCUMENTS

| | | | |
|---|---|---|---|
| 5,654,908 A | 8/1997 | Yokoyama | |
| 5,721,909 A | 2/1998 | Oulid-Aissa et al. | |
| 5,950,193 A | 9/1999 | Kulkarni | |
| 6,049,796 A | 4/2000 | Siitonen et al. | |
| 6,324,541 B1 | 11/2001 | de l'Etraz et al. | |
| 6,366,913 B1 * | 4/2002 | Fitler et al. | 707/9 |
| 6,389,386 B1 | 5/2002 | Hetherington et al. | |
| 6,516,327 B1 * | 2/2003 | Zondervan et al. | 707/200 |
| 6,748,402 B1 | 6/2004 | Reeves et al. | |
| 6,760,735 B1 * | 7/2004 | Rusche | 707/103 R |
| 6,845,370 B2 | 1/2005 | Burkey et al. | |
| 6,963,850 B1 | 11/2005 | Bezos et al. | |
| 7,092,945 B2 | 8/2006 | Hall et al. | |
| 2001/0042118 A1 * | 11/2001 | Miyake et al. | 709/223 |
| 2002/0063154 A1 * | 5/2002 | Hoyos et al. | 235/382.5 |
| 2002/0194165 A1 | 12/2002 | Smith | |
| 2003/0158864 A1 * | 8/2003 | Samn | 707/200 |
| 2003/0167238 A1 * | 9/2003 | Zeif | 705/400 |
| 2004/0193595 A1 * | 9/2004 | Kaminsky et al. | 707/5 |
| 2005/0091272 A1 * | 4/2005 | Smith et al. | 707/104.1 |

(Continued)

FOREIGN PATENT DOCUMENTS

WO 2004038622 A1 5/2004

OTHER PUBLICATIONS

Unknown, "Corporate Directory Services Administration Guide," CDS Org-Chart & PhoneBook Version 2.5, 55 pages, Nakisa Inc., 2001, Canada.

(Continued)

*Primary Examiner*—Charles Rones
*Assistant Examiner*—Yuk Ting Choi
(74) *Attorney, Agent, or Firm*—Senniger Powers LLP

(57) ABSTRACT

A hierarchical address book for an organization is implemented where employees are represented by user objects and departments are represented by department objects. Computer-readable media include executable instructions for displaying and navigating the hierarchical address book. Computer-readable media also include executable instructions for ordering a list of recipients of an electronic mail message as a function of the seniority rating of an object in the hierarchical address book.

15 Claims, 10 Drawing Sheets

U.S. PATENT DOCUMENTS

2005/0273372 A1    12/2005    Bowne et al.
2006/0046768 A1     3/2006    Kirbas

OTHER PUBLICATIONS

Finke, "Institute White Pages as a System Administration," Proceedings of the Tenth Usenix System Administration Conference, 14 pages, 1996, Usenix, USA.

Unknown, "People Picker in NEC Star Office," Screenshot, 2005, 1 page, USA.

Unknown, "Notes Hierarchical Addressbook Add-in CNAP Kanji Addressbook," Screenshot, 2005, 1 page, USA.

Unknown, "Notes Hierarchical Address book Add-in DJX Mail—Department Address book," Screenshot, 2005, 1 page, USA.

Unknown, ".Net Sample Application PresenceBoard Design Document (6)—Workflow Chart/Sequence Chart," printed from http://download.microsoft.com/download/6/e/0/6e0c44fc-20c7-4eb8-aaa7-cb2f784803bb/PresenceBoard_for_.NET_Framework_Workflow.doc, 2003, 24 pages, Microsoft Corporation, USA.

Unknown, ".Net Sample Application PresenceBoard Design Document (2)—UI Flow Chart," printed from http://download.microsoft.com/download/6/e/0/6e0c44fb-20c7-4eb8-aaa7-cb2f784803bb/PresenceBoard_for_.NET_Framework_Screen.doc, 2003, 11 pages, Microsoft Corporation, USA.

Unknown, ".Net Sample Application PresenceBoard Design Document (1)—System Architecture," printed from http://download.microsoft.com/download/6/e/0/6e0c44fc-20c7-4eb8-aaa7-cb2f784803bb/PresenceBoard_for_.NET_Framework_Arch.doc, 2003, 6 pages, Microsoft Corporation, USA.

Unknown, ".Net Sample Application PresenceBoard Design Document (5)—Data-Flow chart," printed from http://download.microsoft.com/download/6/e/0/6e0c44fc-20c7-4eb8-aaa7-cb2f784803bb/PresenceBoard_for_.NET_Framework_Data_Flow.doc, 2003, 23 pages, Microsoft Corporation, USA.

Unknown, "Microsoft Presence Board for .Net Framework," 2002, 49 pages, Microsoft Corporation, USA.

\* cited by examiner

INTEGRATED ADDRESS BOOK BASED ON DEPARTMENTAL HIERARCHY

BACKGROUND

As organizations rely more and more on electronic messages, such as email, to facilitate communication between employees and other business associates, an address book containing all the email addresses of employees and business associates of an organization has become a critical tool. Users consult the address book to determine the location, telephone number, email address, and other important information about the employees or business associates. A commonly utilized approach to the address book design is to display a flat list of "contacts" representing employees and business associates in an organization in alphabetical order by last name. Users search the alphabetical list to locate desired contact information.

However, this can be problematic if the user knows he or she needs to contact someone within a certain department, but is unsure of the name of the person. Additionally, in countries like Japan, employees are more oriented towards working with departments and titles and, thus, prefer information on a departmental rather than individual basis. Furthermore, in countries like Japan, it is considered rude to have a more senior person identified after a less senior person in the recipient line of an electronic message.

SUMMARY

Embodiments of the invention provide an address book view of a departmental hierarchy integrated with electronic messaging. In one aspect of the invention, a hierarchical address book for an organization represents employees by user objects and represents departments by department objects. Computer-executable instructions display and enable navigation of the hierarchical address book. Advantageously, aspects of the invention improve the address book user experience and provide resource and cost savings in administering and maintaining the integrated departmental hierarchy.

Further aspects of the invention order a list of recipients corresponding to objects in the hierarchical address book according to a seniority rating of the object in the hierarchical address book. Aspects of the invention may also synchronize, via replication, employee and department information maintained by other systems with the objects in the hierarchical address book.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
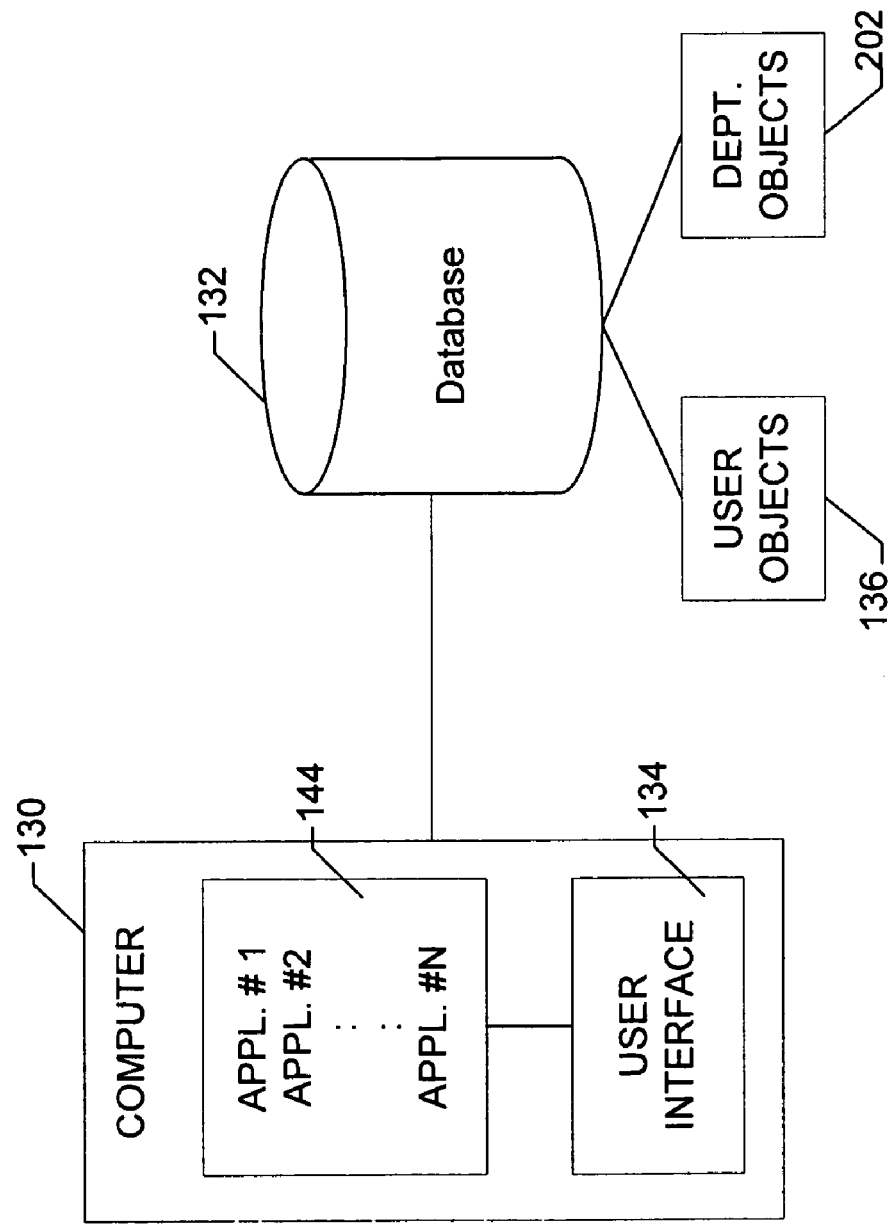
FIG. 1 is a block diagram illustrating a computing system environment for a hierarchical address book according to an embodiment of the invention.

Referring to the drawings, FIG. 1 illustrates a computing system for implementing a hierarchical address book according to aspects of the invention. In one embodiment of the invention, a computer such as the computer 130 is suitable for use in the other figures illustrated and described herein. Computer 130 has one or more processors or processing units and a system memory.

In one embodiment, the hierarchical address book (HAB) displays contact information for a plurality of employees, business associates, or other persons associated with a business organization. For example, the HAB maintains a hierarchy of departments for the business organization. The HAB allows a user to navigate the HAB through the hierarchy of departments to locate the employee. As shown, a computing device 130 interacts with a directory service database 132 for implementing the HAB, which is presented to a user via a graphical user interface (GUI) 134. A directory service is, for example, a service on a network that returns email addresses and other information to users and enables a user to locate hosts and services.

The database 132 stores a hierarchy of user objects 136 associated with a hierarchy of department objects 202. It is to be understood that the GUI 134 may be integrated with other system applications 144 executed by the computing device 130. For example, GUI 134 may be integrated with an electronic messaging client or a resource sharing application. In another embodiment, department objects 202 may serve as security principals for assigning access rights to employees. In this embodiment, for example, an employee can share content such as his/her calendar with employees associated with a department by selecting the department object 202 from the HAB.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

According to aspects of the invention, the department objects 202 represent departments within an organization while the user objects 136 represent employees or business associates of the organization. A user of the HAB finds and selects employees or business associates in the organization using the GUI 134. A user may enter commands and information into computer 130 through input devices or user interface selection devices such as a keyboard 140 and a pointing device (e.g., a mouse, trackball, pen, or touch pad). Other input devices (not shown) may include a microphone, joystick, game pad, satellite dish, scanner, or the like. A monitor or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 142.

In one embodiment, the directory service database 132 stores the department objects 202 and user objects 136. The user objects 136 store contact information about an employee or business associate and may include properties such as name, office location, phone number, title, and email address. The user objects 136 may also include the following properties: member of department property representing the departments the employee belongs to and a seniority rating representing the seniority of the employee compared to other employees in the organization. The user object 136 may be a member of zero or more department objects 202.

In one embodiment, the seniority rating represents the relative importance or seniority of an employee. For example, the higher the value of the seniority rating, the higher the seniority of the employee. The seniority rating may be calculated as a function of one or more of the following parameters: a number of years of service of the employee, an age of the employee, an experience level of the employee, an education level of the employee, and a merit of the employee. In another embodiment, the seniority rating of the department objects 202 and user objects 136 is tracked and maintained in a related application.

In an embodiment for systems that host two or more organizations, each user object 136 includes a reference to the root department of the organization. The root department of the organization represents the department that is the highest department in a hierarchy 200 of departments for an organization.

In another embodiment, the HAB includes organization objects that store information about a company or organization and typically include fields such as name, mailing address, and phone number. The organization objects include a reference to the root department of the organization. The root department of an organization may only reference one department object 202.

Although described in connection with an exemplary computing system environment, including computer 130, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, computer 130 executes computer-executable instructions such as those illustrated in the figures to implement aspects of the invention.

Figure 2:
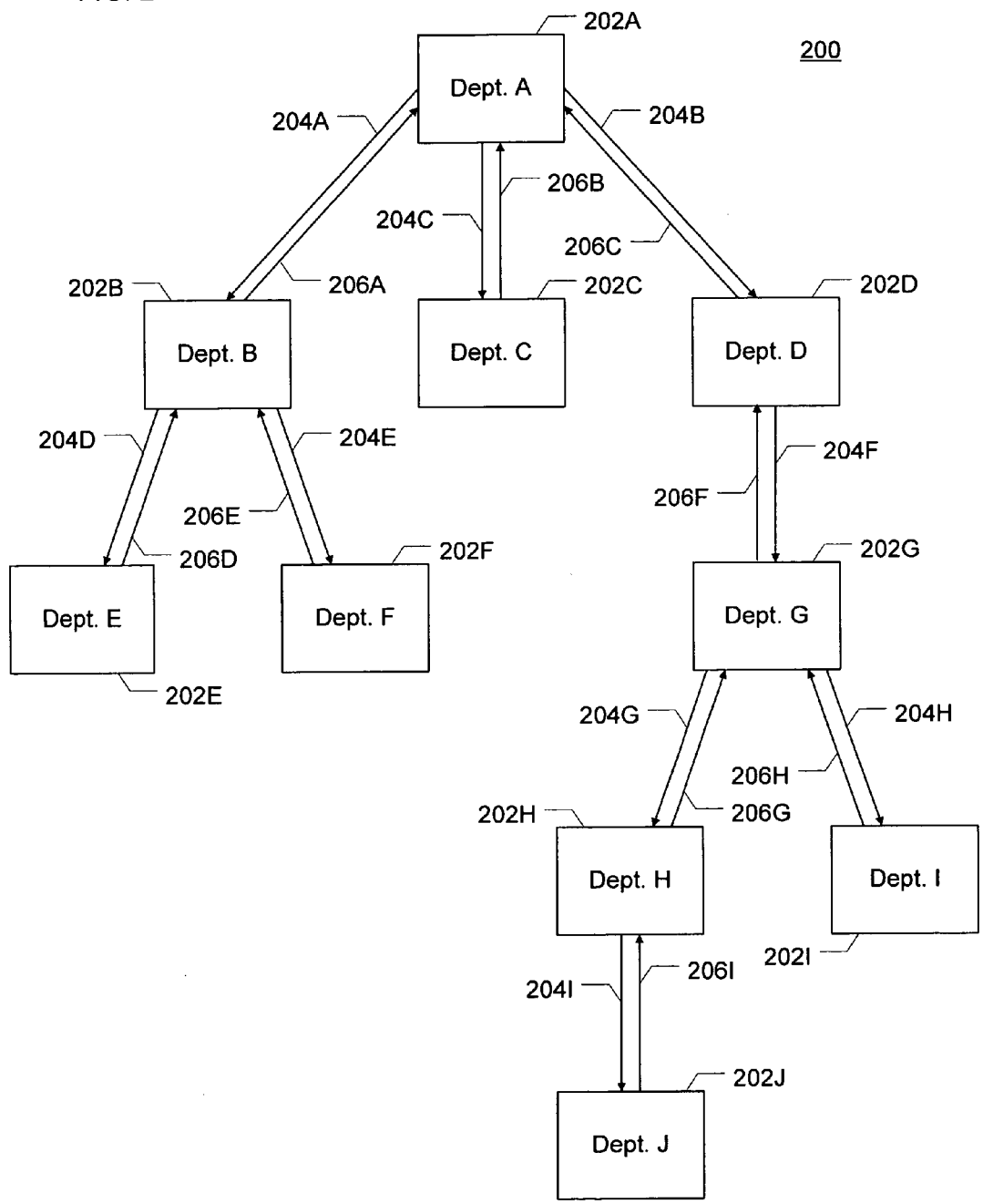
FIG. 2 is an exemplary block diagram illustrating one embodiment of the department hierarchy.

FIG. 2 illustrates an exemplary hierarchy 200 of department objects 202 according to one embodiment of the invention. The department object 202 includes one or more of the following properties: display name property representing the name of the department; a phonetic display name property representing a phonetic version of the name of the department; a seniority rating representing the seniority of the department; a department members link representing all users who are members of the department; a child department link 204 representing all departments one level subordinate in the hierarchy 200 compared to the department; and a parent department link 206 representing the department that is one level higher in the hierarchy 200 compared to the department. In one embodiment, in Japan, the phonetic display name property is written in Hiragana or Katakana, while the display name property is in Kanji. Implementing the hierarchy 200 in department objects 202 permits the user to navigate through the HAB by department to locate employees within the departments. Thus, a user can locate the employee by department and job title even if the user does not know or is unsure of the employee's name.

In another embodiment, the seniority rating represents the most important or senior department. The higher the value of the seniority rating, the higher the seniority of the department. The seniority rating may be calculated as a function of the number of years since the department was created or the age of most senior department member.

In yet another embodiment, each department object 202 includes a root department property representing the relative level of departments in the hierarchy for an organization. This is implemented in systems hosting two or more organizations. In this embodiment, each organization has access limited to information regarding their departments and users. To find the root department of an organization, the HAB performs a check of a PR_EMS_AB_HAB_ROOT_DEPARTMENT attribute of the Organization Container of the directory service database 132 (derived from the user), and searches for the department object having that value as LegacyDN.

Referring further to FIG. 2, each department object 202 represents a department in the hierarchy 200. The department object 202 may have only one parent department link 206.

The parent department is one level higher in hierarchy 200 than the department. A child department is one level subordinate to the department in the hierarchy 200. The child departments of a department are maintained in the child department link 204. For example, in FIG. 2, Department G 202G has two subordinate departments, namely, Department H 202H and Department I 202I, and one parent department, namely, Department D 202D, in the hierarchy 200. Accordingly, Department G's 202G parent department link 206F contains the reference to Department D 202D. And Department G's 202G child department link 204G, 204H contains the reference to Department H 202H and Department I 202I. The reference may be a list of one or more department object IDs, pointers to department objects, links to department objects or other implementations that allow one department object 202 to reference another department object 202 in the hierarchy 200.

In one embodiment, department objects 202 are email-enabled. In this embodiment, an email addressed to the department is delivered in one or more of the following ways: to all departments subordinate to the department in the hierarchy 200, to a manager of the department, to all employees within the department, to all employees of subordinate departments in the hierarchy 200, to only the manager of the department, to all employees within all departments subordinate to the department in the hierarchy 200, and to a department mailbox where all members of the department have access to the mailbox. Advantageously, aspects of the invention allow a system administrator to configure the way in departmental emails are delivered.

Figure 3:
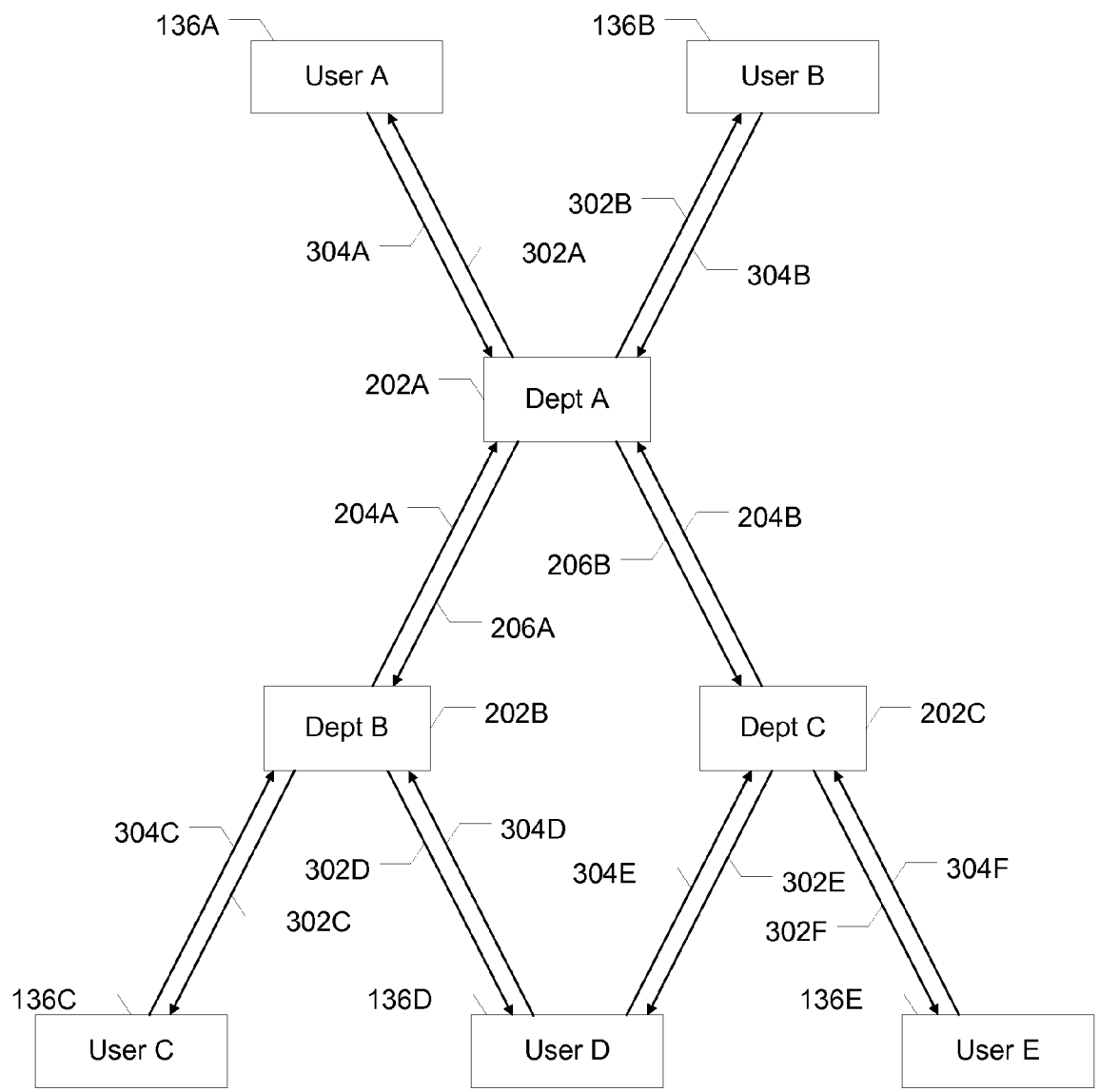
FIG. 3 is an exemplary block diagram illustrating one embodiment of the relationship between user objects and department objects of the hierarchical address book.

FIG. 3 illustrates an exemplary relationship between user objects 136 and department objects 202 in the HAB. In FIG. 3, User D 136D and User E 136E are members of Department C 202C. Accordingly, Department C's 202C department member link contains the reference 302E to User D 136D and the reference 302F to User E 136E. Additionally, in FIG. 3, User A 136A is a member of Department A 202A. Accordingly, User A's 136A member of department property contains the reference 304A to Department A 202A. Also, the user object 136 may belong to more than one department. In FIG. 3, User D 136D is a member of Department B 202B and Department C 202C. Accordingly, User D's 136D member of department property contains the reference 304D to Department D 202B and the reference 304E to Department C 202C.

The HAB may be administered by synchronizing department and user information contained in another system of the organization via replication or through a graphical user interface tool where an administrator can create, delete, rename, and move department objects in the hierarchy and manage the membership of user objects for a department object.

Appendix A contains an exemplary schema and Appendix B contains a functional specification for implementing the hierarchical address book in a directory service server database such as database 132.

Figure 4:
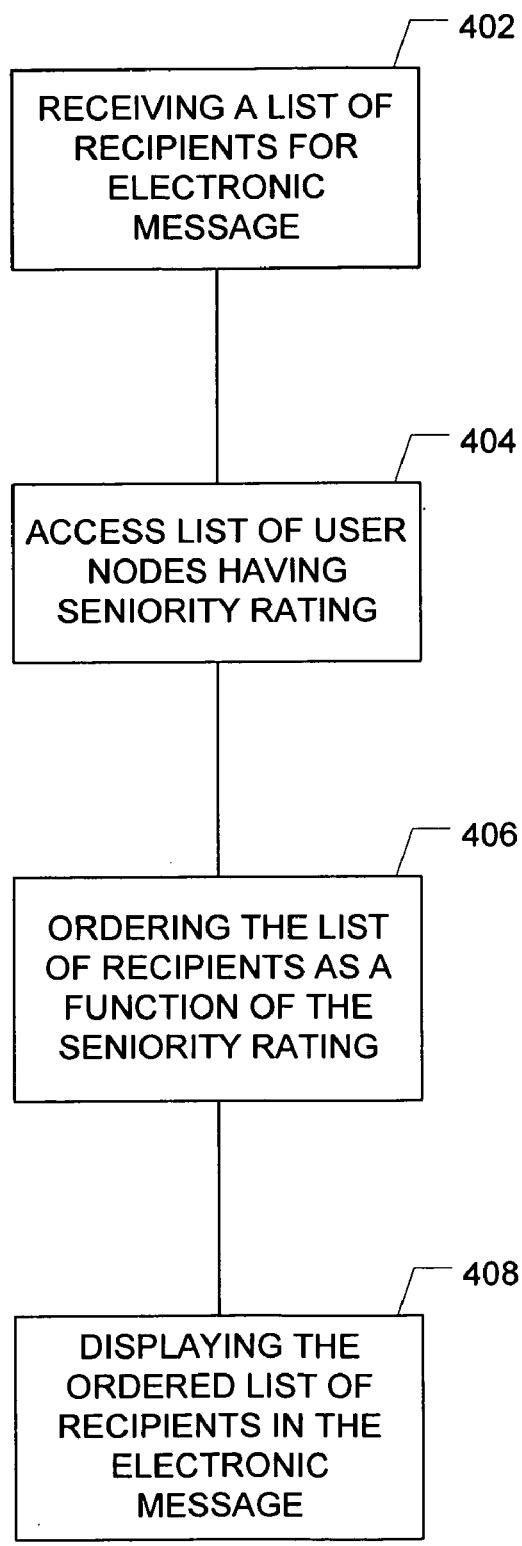
FIG. 4 is an exemplary flow diagram illustrating the ordering of recipients of an electronic message utilizing the hierarchical address book according to an embodiment of the invention.

FIG. 4 illustrates a method of ordering recipients of an electronic message according to one embodiment of the invention. As described above, a directory service database, such as database 132, maintains the HAB. The directory service may be provided by another server in the network and accessed through a network connection. In another embodiment, an application programming interface accesses the HAB. Moreover, access to the HAB may be integrated into other applications 144, such as an electronic messaging client.

Beginning at 402, the electronic messaging client receives a list of intended recipients for an electronic message. Each recipient refers to one of the user objects 136 in the HAB. In one embodiment, the references in the recipient list include one or more of the following: email addresses and display names. In another embodiment, the recipients refer to user objects 136 and department objects 202. At 404, user objects 136 of the HAB are accessed to determine the seniority rating of the user object 136 referenced in the list of intended recipients.

At 406, the list of intended recipients is ordered as a function of the seniority rating of the user object 136. In one embodiment, the recipients appear in the list in decreasing seniority rating order. In another embodiment, where the recipients refer to user objects 136 and department objects 202, the recipients are order as function of their seniority rating. For example, suppose the recipient list contains three references: Sue (user object) with a seniority rating of 5, Marketing Department (department object) with a seniority rating of 7 and Bob (user object) with a seniority rating of 15. The ordered list of recipients would be: Bob, Marketing Department and Sue.

In FIG. 4, at 408, the electronic messaging client receives the ordered list of recipients and displays the ordered list to the user in the electronic message. By ordering the list of recipients according to the HAB and the seniority rating of department objects 202 and user objects 136, GUI 134 can automatically display references to departments and employees in the recipient list in an order that conforms to the customs of countries where it is considered rude to have a more senior person identified after a less senior person in the recipient line of an electronic message.

Figure 5:
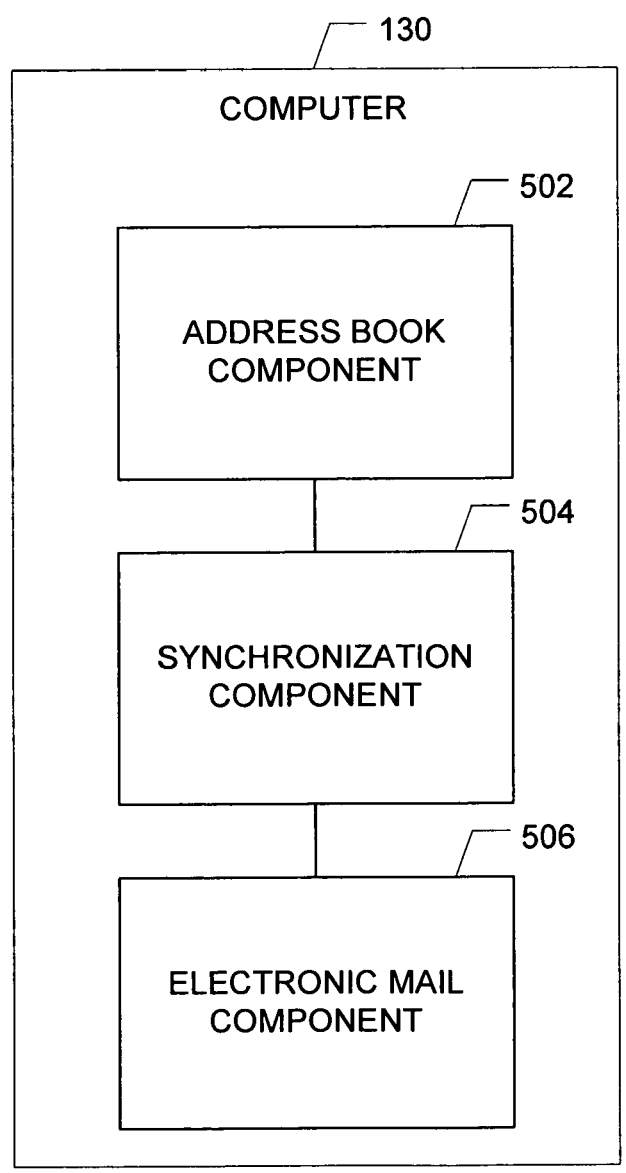
FIG. 5 is a block diagram illustrating an exemplary computer-readable medium on which one embodiment of the invention may be stored.

FIG. 5 is a block diagram illustrating an exemplary computer-readable medium on which one embodiment of the invention may be stored. An address book component 502 contains a hierarchy of department objects 202 and user objects 136 such as those described with reference to FIGS. 2 and 3. In one embodiment, the address book component 502 is part of the directory service and is stored in a database associated with the directory service (e.g., database 132). In an alternative embodiment, the address book component 502 includes an application program interface to access and maintain the hierarchy of department objects 202 and user objects 136.

A synchronization component 504 synchronizes department and user information maintained another system of the organization via replication or through a graphical user interface tool where administrators can create, delete, rename, and move department objects 202 in the address book component 502 and manage the membership of user objects 136 for a department object 202.

In one embodiment, the organization maintains a reporting line hierarchy for the organization. The synchronization component 504 accesses the reporting line hierarchy and updates the address book component 502 by adding, deleting, and updating department objects 202 and user objects 136 such that the information in the address book component 502 is consistent with the reporting line hierarchy.

The electronic mail component 506 integrates an email client with the address book component 502. The electronic mail component 506 features a graphical user interface (GUI) (e.g., GUI 134) that allows a user to navigate through the address book component 502 and select department objects 202 or user objects 136 as recipients for an email.

Figure 6:
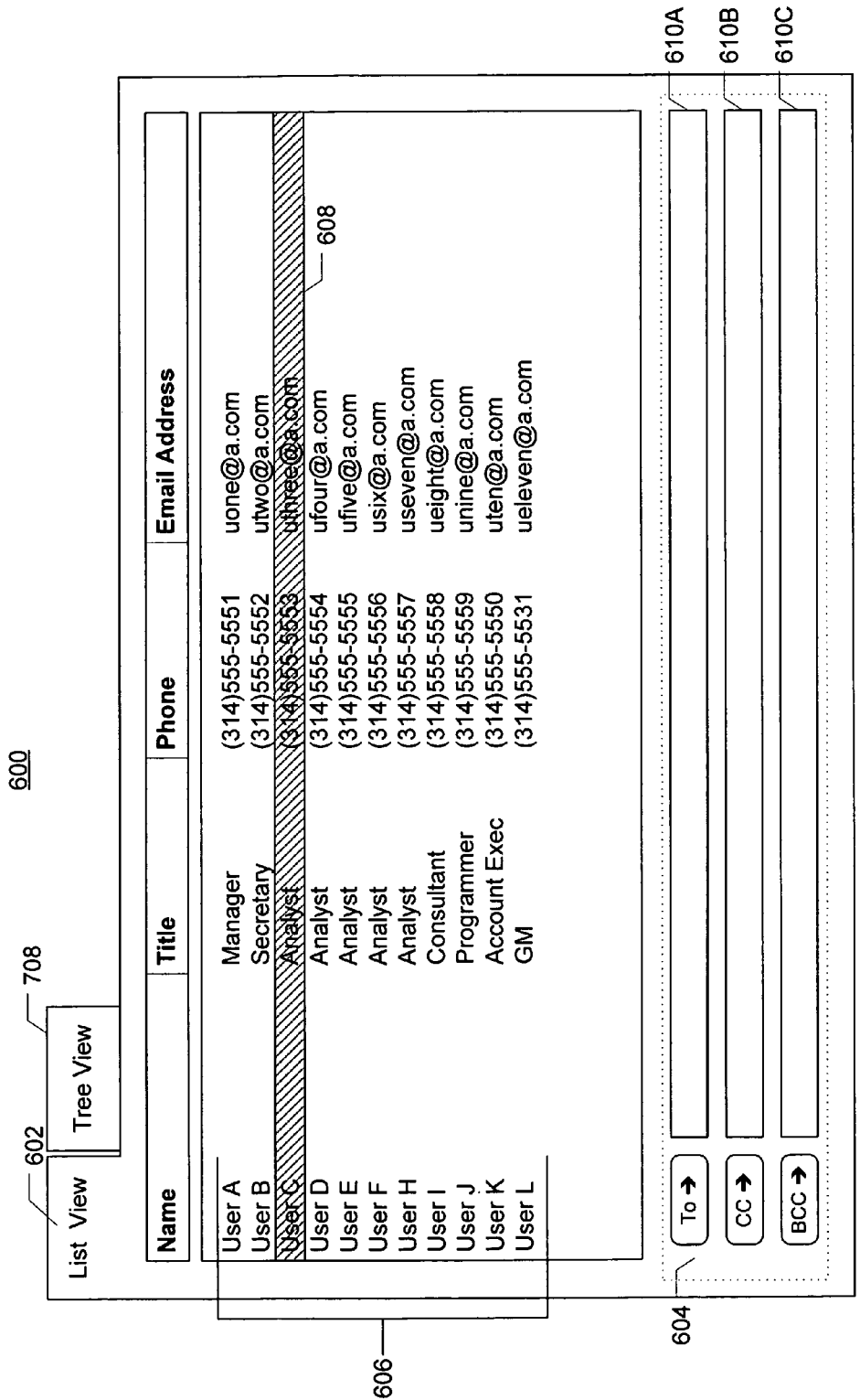
FIG. 6 illustrates one embodiment of a list view of the graphical user interface to access the hierarchical address book.
Figure 7:
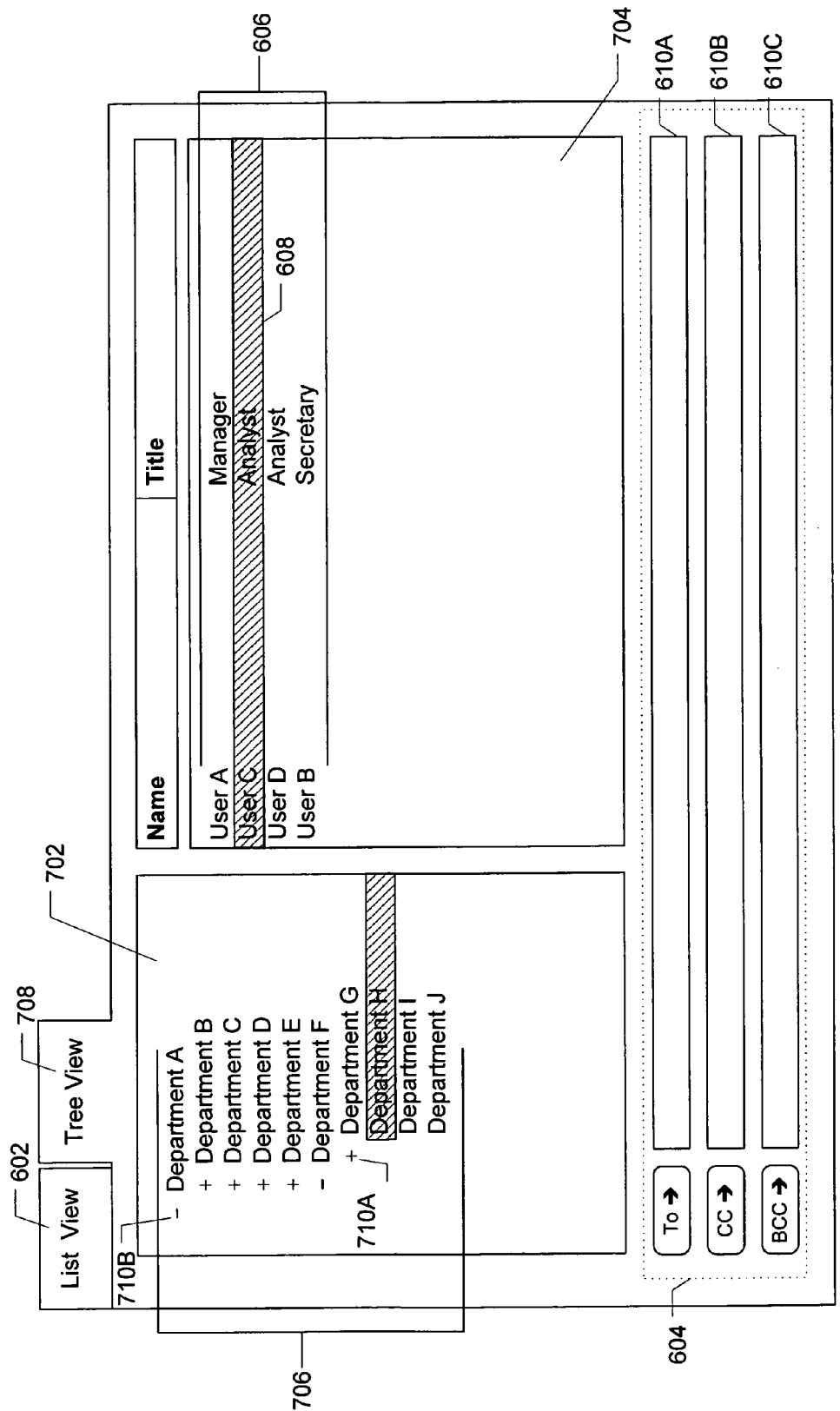
FIG. 7 illustrates one embodiment of a tree view of the graphical user interface to access the hierarchical address book.

In one embodiment, the GUI includes two views of the address book component 502, namely, a list view 600 illustrated in FIG. 6 and a tree view 700 illustrated in FIG. 7. Referring first to FIG. 6, the list view 600 includes a list view tab 602 and a recipients well 604. In the list view 600, the GUI displays user objects 606 ordered by name or some other specified criteria. For example, the GUI may display the following properties for each user object 606: name, title, phone number, and email address. The user of the GUI may select the user object 606 in the list view 600 by selecting the user object 606 with a mouse, keyboard or another selection device. Once selected, the user object 606 appears highlighted in the display. Highlighting alters the appearance of displayed characters as a means of calling attention to them. In an embodiment, highlighting includes displaying the characters in one or more of the following formats: reverse video (light on dark), bolded, italicized, underlined, uppercase characters and characters in a particular font. For example, in FIG. 6, User C 608 has been selected and highlighted in the list view 600.

Once a user object 606 has been selected, the user may add the user object's 606 email address to an electronic message by selecting one of the options in the recipients well 604. FIG. 6 illustrates an embodiment with three options in the recipients well 604: 'to' copies the selected user object's email address in the 'to' recipient list 610A of an email; 'cc' copies the selected user object's email address in the carbon copy recipient list 610B of an email; and 'bcc' copies the selected user object's email address in the blind carbon copy recipient list 610C of an email. In one embodiment, each recipient list 610 of the recipient well 604 is ordered according to method described above. In addition, list view 600 includes a tree view tab 708 (see FIG. 7).

Referring next to FIG. 7, the tree view 700 is divided into three sections: a tree pane 702, a people pane 704, and recipient's well 604. The tree pane 702 lists the department objects 706 in hierarchical order, the people pane 704 lists user objects 606, and the recipients well 604 is used to send email to selected departments and users. The GUI includes functionality to allow the user to switch back and forth between the tree view 700 and the list view 600 by selecting the list view tab 602 for the list view 600 and the tree view tab 708 for the tree view 700.

In one embodiment, the address book component 502 saves the view that was active when the GUI is closed and opens the GUI to that view the next time the address book component 502 is accessed. For example, the user selects the tree view tab 708 to view the address book component 502 in tree view 700. Then, in tree view 700, the user closes the GUI. The next time the user accesses the address book component 502, the GUI opens to the tree view 700 with the tree view tab 708 selected.

In another embodiment, the last selected view is stored in a central database used to maintain information for configuring a computer system for users, applications and hardware devices. In this embodiment, at startup, the address book component 502 checks the database to determine the last view selected by the user and displays that view to the user. And, when the user closes the GUI, the address book component 502 writes the last selected view, either tree view 700 or list view 600, to the database so the next time the user accesses the address book component 502 the GUI can display the last selected view.

In FIG. 7, the tree pane 702 displays a subset of department objects 706 in the address book component 502. For each department object 706 in tree pane 702, a status indicator and the department name is displayed. If the length of the department name exceeds the width of tree pane 702, the entire department name is in the tree pane 702 and accessible with a horizontal scrollbar. In one embodiment, the display for the department object 706 in the tree pane 702 may be accompanied by a department icon.

When the user selects a department name using a mouse or other input device, the corresponding department object opens and appears selected in the GUI (department highlighted in the GUI). For example, in FIG. 7 Department H is currently selected (shown by highlighting). If the user selects the Department G name in the tree pane 702, Department G opens revealing subordinate departments, if they exist. And, Department G appears selected (highlighted) and Department H appears unselected (unhighlighted).

The status indicator 710 indicates if the department object 706 is opened or closed. In one embodiment a "+" 710A indicates the department object is closed and a 710B indicates that the department object is opened. The "+" 710A indicates that the department has one or more subordinate departments and the department is closed. The 710B indicates that the department has at least one subordinate department and the department is open. If the status indicator 710 is not displayed, the department does not have one or more subordinate departments. For example, in FIG. 7, Department H does not have a subordinate department.

In one embodiment, to enhance performance, the department object 706 is accompanied by "+" 710A as a default (except for the root department). Once the user selects the department object 706, the GUI determines if subordinate department objects are available by accessing the address book component 502 and checking the child department link of the department object 706. If subordinate department objects 706 are available, the indicator remains a "+" 710A. If no subordinate department objects 706 are available, then no status indicator 710 is displayed. For example in FIG. 7, if Department B is selected, the GUI determines if Department B has at least one subordinate department object. If Department B has at least one subordinate department object 706, the status indicator 710 remains a "+" 710A. If Department B has no subordinate department objects 706, the status indicator 710 is removed from the tree pane 702.

When the user selects the closed indicator 710A for the department object 706 that department object 706 opens but the selection remains on the department object 706 (department highlighted in the GUI). For example in FIG. 7, if the user selects the closed indicator 710B of Department G, Department G opens revealing subordinate department objects 706, if they exist, and the open indicator 710A is displayed next to the department name. But, Department H remains selected (highlighted).

When the user selects the open indicator 710A, that department object closes and any subordinate department objects in the address book component 502 do not appear in the tree pane 702. For example in FIG. 7, if the user selects the open indicator 710A of Department F, Department F displays with the close indicator 710B and remains in the tree pane 702. Accordingly, subordinate departments Department G, Department H, Department I, and Department J are removed from the tree pane 702.

The GUI renders the tree view 700 by displaying the hierarchy of department objects 706. When user accesses address book component 502, as a default, the root department is opened and the subordinate department objects 706 are closed. For example, when the user would open the address book component 502 illustrated in FIG. 7, Department A is opened in the tree pane 702 with subordinate departments Department A, Department B, Department C, Department D, Department E, and Department F listed in the tree pane 702. The departments subordinate to Department F, departments Department G, Department H, Department I, and Department J would not be listed in the tree pane 702.

In the tree pane 702, the department objects 706 may be ordered by one or more of the following orders: seniority rating, descending; department name, ascending; and if the user is in Japan and the phonetic display name is populated, by phonetic display name, ascending. In the last case, it is possible to have department objects 706 where the phonetic display name is empty for some department objects 706. In this case, the department objects 706 with a blank phonetic display name will be ordered according to the department name and placed in order by comparing the department name to the other department objects' phonetic display name.

When the user selects one of the department objects 706 in the tree pane, the selected department will be highlighted. FIG. 7 illustrates a view where Department H has been selected. By default, the root department is selected when the address book component 502 is accessed.

In one embodiment, the GUI generates a context menu for the selected department. The context menu contains options available to the selected object. In this embodiment, the user may select all members of the selected department from context menu. Once the members have been selected, the user may send an electronic message to all members or set an appointment with all members of the department.

The people pane 704 displays the user objects 606 of the selected department object 706 by accessing the address book component 502 and checking the department member property of the selected department object. Thus, the user of the GUI can navigate the address book component 502 by department to locate employees of that department. This allows the user to locate an employee in a department even if the employee does not know or is unsure of the employee's name.

In one embodiment, the people pane 704 lists the user name and title of a user object 606 for users who are members of the selected department in the tree pane 702. In FIG. 7, User A, User B, User C, and User D shown in the people pane 704 are members of selected (highlighted) Department H in the tree pane 702. In another embodiment, for users in Japan, the GUI displays a phonetic display name in the people pane 704.

The user objects 606 in the people pane 704 may be ordered by one or more of the following orders: seniority rating, descending; user name, ascending; and if the user is in Japan and the phonetic display name is populated, by phonetic display name, ascending. In the last case, it is possible to have user objects where the phonetic display name is empty for some user objects. In this case, the user object 606 with the blank phonetic display name is ordered according to the user name and placed in order by comparing the user name to the other user objects' phonetic display name. The user objects 606 in the list view 600 of the GUI may also be ordered in a similar fashion. The people pane 704 is blank if the department selected in the tree pane 702 has no members. In one embodiment, the people pane 704 may contain other email enabled objects, such as distribution lists or resources that are members of the department in addition to the user objects 606.

The recipients well 604 is used to address an electronic message to one or more users or departments. Once a user object 606 or department object 706 has been selected, the user may add the user object's 606 or department object's 706 email address to an email by selecting one of the options in the recipients well 604. FIG. 7 illustrates an embodiment with three options in the recipients well 604: 'to' copies the selected user object's or department object's email address in the 'to' recipient list 610A of an email; 'cc' copies the selected user object's or department object's email address in the carbon copy recipient list 610B of an email; and 'bcc' copies the selected user object's or department object's email address in the blind carbon copy recipient list 610C of an email. In one embodiment, each recipient list 610 of the recipient well 604 is ordered according to method described above.

In another embodiment, a default department may be set to reduce the time to browse through the tree pane 702 from the root department to frequently accessed departments. The user can set the default department from the context menu of the department object 706. When a default department is set by the user and the tree view 700 of the GUI is to open, the department object 706 of the default department opens, the address book component 502 between the root department and the default department opens, all other departments are closed, and the default department is selected.

In one embodiment, the default department stored in central database used to maintain information for configuring a computer system for users, applications and hardware devices. In this embodiment, at startup, the GUI checks the database to determine if the user has set a default department. If the user has, the GUI opens the default department in the in the tree pane 702 of the tree view 700 as described above. And, if the user sets a default department while accessing the GUI, the GUI writes the default department to the database so the default department is available the next time the user accesses the GUI. If the default department is no longer valid, e.g. the department object 706 has been deleted from the address book component 502, the GUI removes the entry from the database and opens the tree pane 702 with the root department selected.

When user switches from list view 600 to tree view 700 in the GUI, the user selected in list view 600 appears selected in the tree view 700. Therefore, all the department objects 706 between the root department and the department of the select user are open.

For example, in FIG. 6, User C 608 is selected in list view 600. User C 608 is a member of Department H. When the user switches from the list view 600 to the tree view 700, as shown in FIG. 7, User C is selected in the people pane 704 and the department tree will be open to User C's department, Department H. If User C 608 is not the member of any department, when the user switches to tree view 700 the selection is ignored and the tree view 700 opens in default status with the first user in the root department selected.

The same functionally exists when a user switches from tree view 700 to list view 600. For example, if Department H is open and User C 608 is selected in tree view 700 as shown in FIG. 7, when the user switches to list view 600, the list of users opens with User C 608 selected as shown in FIG. 6. If multiple user objects are selected in the list view 600 when the user switches to tree view 700, the tree view 700 opens to the department of the last selected user object 606 with the last user object 606 selected in the people pane 604.

Figure 8:
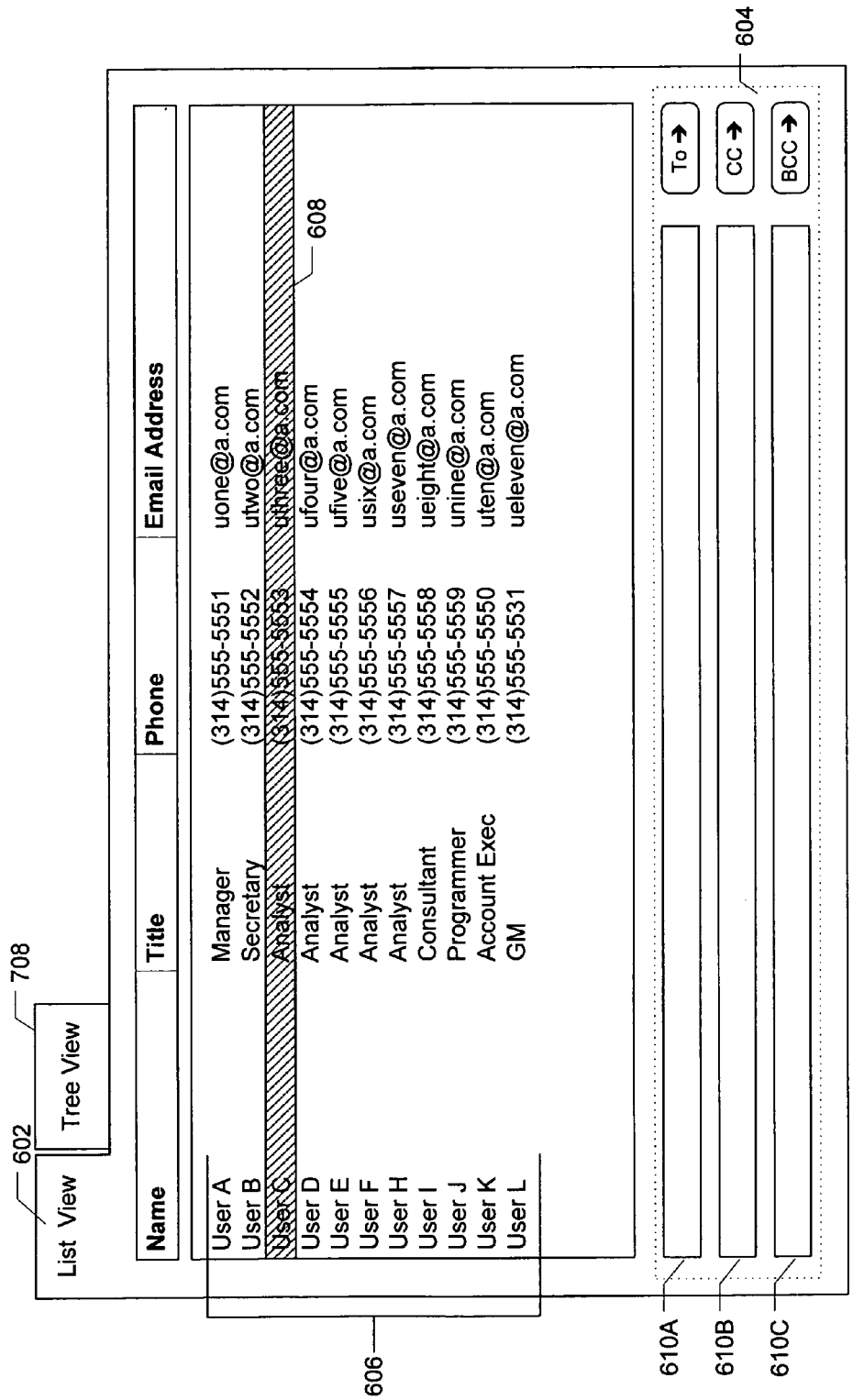
FIG. 8 illustrates one embodiment of a list view in bidirectional format of the graphical user interface to access the hierarchical address book.
Figure 9:
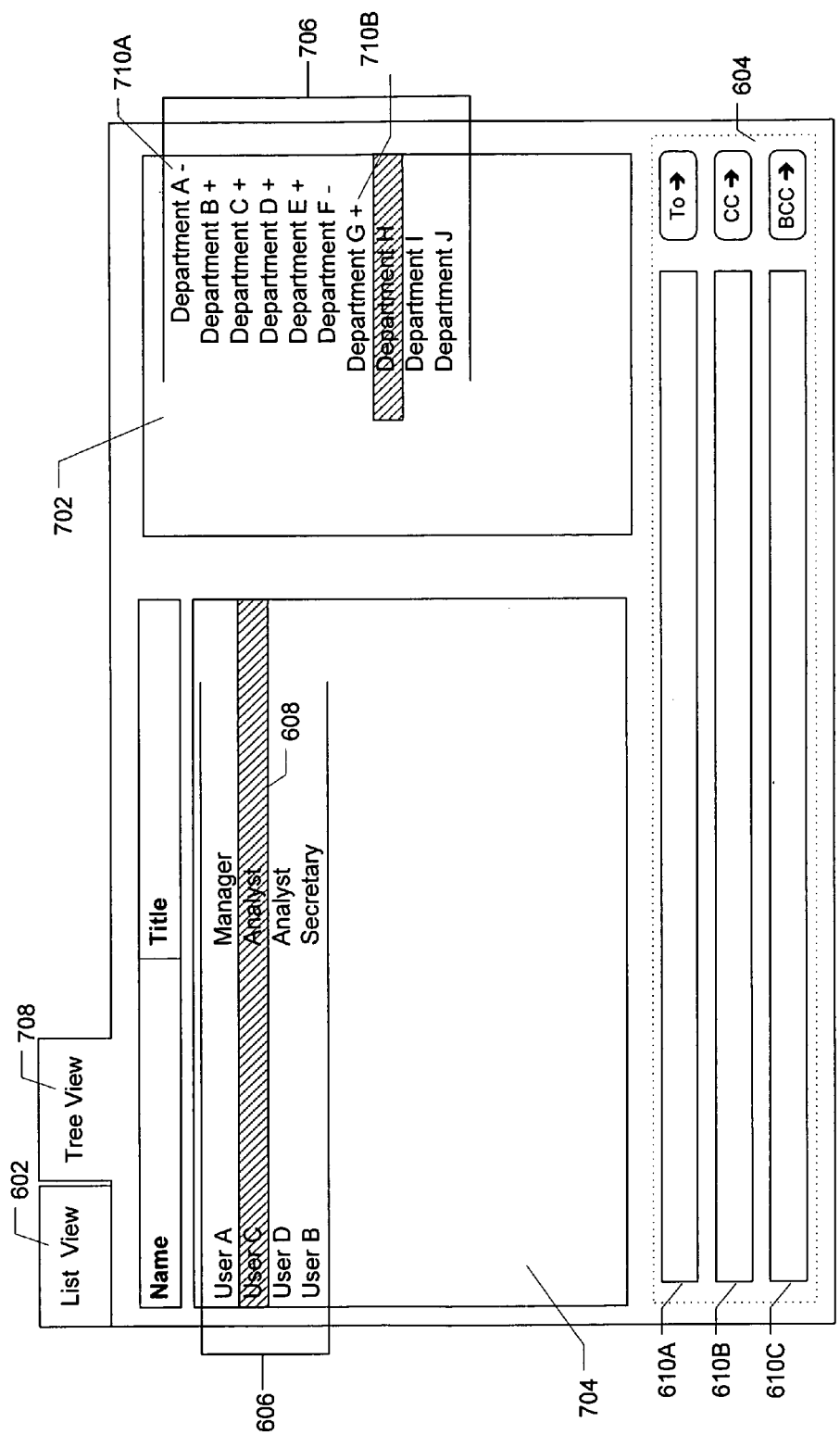
FIG. 9 illustrates one embodiment of a tree view in bidirectional format of the graphical user interface to access the hierarchical address book.

In another embodiment, the GUI supports a bidirectional text format. The GUI displays right-to-left as illustrated in FIG. 8 for the list view and FIG. 9 for the tree view.

Figure 10:
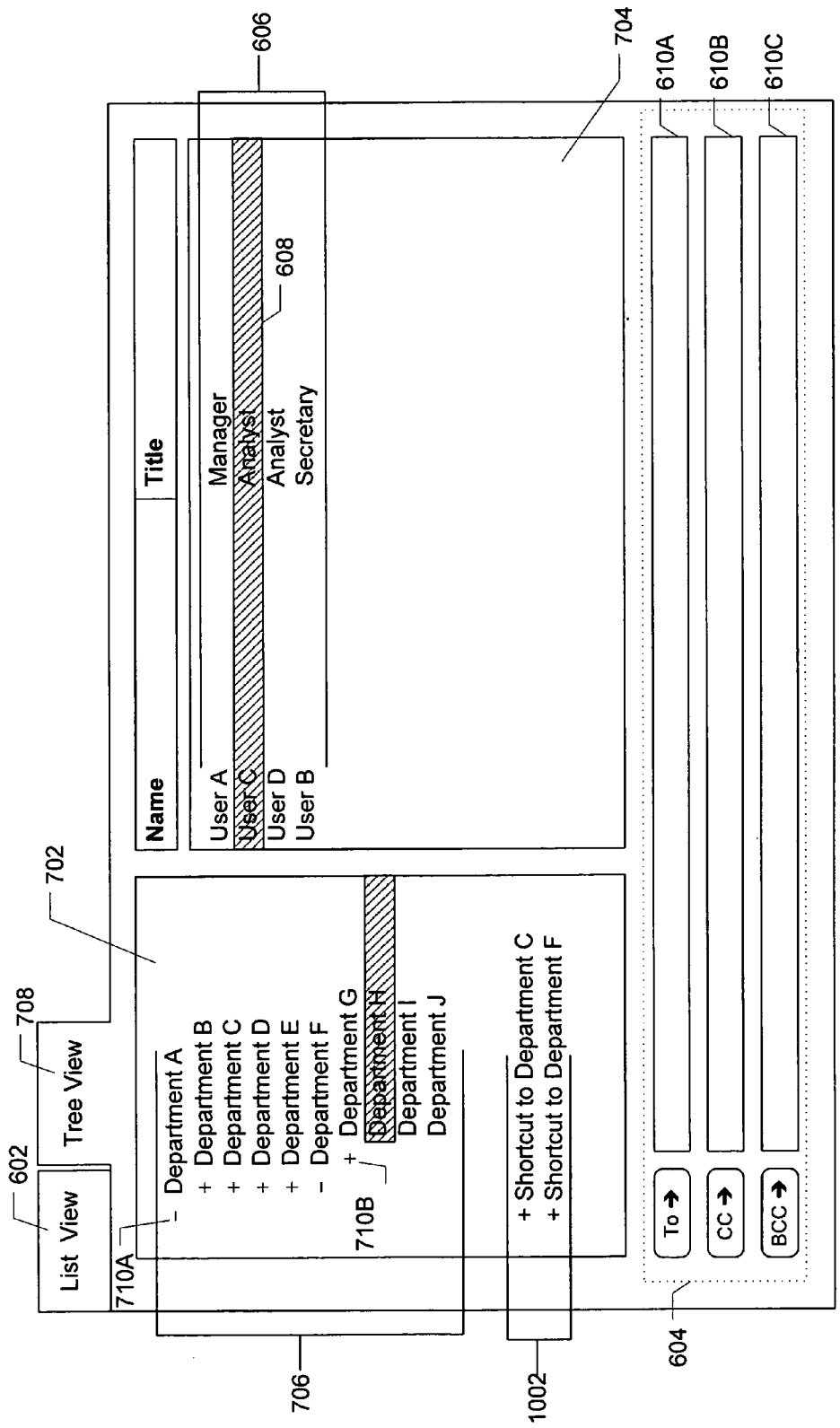
FIG. 10 illustrates one embodiment of a tree view of the graphical user interface to access the hierarchical address book with shortcuts enabled.

Referring now to FIG. 10, if the organization the user belongs to contains many departments, it may be time consuming and inconvenient to browse through the tree pane 702 from the root department. Therefore, in an embodiment of the invention, the user may create a shortcut 1002 to frequently referenced departments. The user can create the shortcut from context menu of the department object. The context menu is disabled when the department object 706 does not have any subordinate departments, and for the root department. Shortcut trees 1002 for department objects 706 are listed under the address book component 502 tree in the tree pane 702. The icon for the shortcut department is different than any icon used for departments in the address book component 502 tree. The shortcut to a department has the same functionally as for department objects 706 described above. For example, the user may open and close the shortcut as described above with regard to department objects 706 in the tree pane 702. Shortcuts trees 1002 are ordered in one or more of the following orders: seniority rating, descending and phonetic display name, ascending.

In one embodiment, the shortcuts are stored in a central database used to maintain information for configuring a computer system for users, applications and hardware devices. In this embodiment, at startup, the GUI checks the database to determine if the user has created any shortcuts. If the user has created at least one shortcut, the shortcuts appear below the address book component 502 in the tree pane 702 of the tree view 700. And, if the user creates any new shortcuts while using the GUI, the GUI writes the shortcuts to the database so the shortcuts are available the next time the user accesses the address book component 502.

As illustrated in FIG. 10, there can be multiple department roots in the tree pane 702 including the root department of the address book component 502 and the root department of any shortcut trees 1002. When user opens the GUI, either the tree view 700 or the list view 600 opens as described above. If the GUI is to open in tree view 700, the selection is at the root department of the last used tree. For example, in FIG. 10, if Department B was selected at the time the user closed the GUI, then Department A will be selected the next time the user opens the GUI.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Appendix A contains a schema and a functional specification for implementing the hierarchical address book on a directory service server. The schema is in LDAP Data Interchange Format (LDIF) representing changes made to a database associated with the directory service to implement the directory object and modifications to other objects to support the new directory object. The LDAP Data Interchange Format (LDIF) is an Internet standard for a file format that may be used for performing batch operations against directories that conform to the LDAP (Lightweight Directory Access Protocol) standards.

```
######attribute shchema update for Mail-recipient############ dn: CN=ms-Exch-HAB-Show-In-
Departments,CN=Schema,CN=Configuration,DC=hab,DC=com
changetype: add
attributeID:
1.2.840.113556.1.4.7000.233.28688.28684.8.463682.945039.1932988.922296.1.13
attributeSyntax: 2.5.5.1
isSingleValued: FALSE
ldapDisplayName: msExchHABShowInDepartments
oMSyntax: 127
objectClass: attributeSchema
attributeSecurityGuid:: iYopH5jeuEelzVcqlT0mfg==
isMemberOfPartialAttributeSet: TRUE
linkID: 2074
mapiId: 35988

############attribute shchema update for ms-Exch-organization-
container############ dn: CN=ms-Exch-HAB-Root-Department-
Link,CN=Schema,CN=Configuration,DC=hab,DC=com
changetype: add
attributeID:
1.2.840.113556.1.4.7000.233.28688.28684.8.463682.945039.1932988.922296.1.14
attributeSyntax: 2.5.5.1
isSingleValued: TRUE
ldapDisplayName: msExchHABRootDepartmentLink
oMSyntax: 127
objectClass: attributeSchema
linkID: 2076
mapiId: 35992 dn:
changetype: modify
replace: schemaUpdateNow
schemaUpdateNow: 1
-

############bind msExchHABShowInDepartments attribute to mail-recipient
class############ dn: CN=Mail-Recipient,CN=Schema,CN=Configuration,DC=hab,DC=com
changetype: modify
add: mayContain
mayContain: msExchHABShowInDepartments
-
```

```
############bind msExchHABRootDepartmentLink attribute to ms-Exch-
organization-container class############ dn: CN=ms-Exch-Organization-
Container,CN=Schema,CN=Configuration,DC=hab,DC=com
changetype: modify
add: mayContain
mayContain: msExchHABRootDepartmentLink
- dn:
changetype: modify
replace: schemaUpdateNow
schemaUpdateNow: 1
-

######attribute shchema update for Department class############ dn: CN=ms-Exch-HAB-Show-In-Departments-
BL,CN=Schema,CN=Configuration,DC=hab,DC=com
changetype: add
attributeID:
1.2.840.113556.1.4.7000.233.28688.28684.8.463682.945039.1932988.922296.1.11
attributeSyntax: 2.5.5.1
isSingleValued: FALSE
ldapDisplayName: msExchHABShowInDepartmentsBL
oMSyntax: 127
objectClass: attributeSchema
isMemberOfPartialAttributeSet: FALSE
linkID: 2075
mapiId: 35991 dn: CN=ms-Exch-HAB-Root-Department-
BL,CN=Schema,CN=Configuration,DC=hab,DC=com
changetype: add
attributeID:
1.2.840.113556.1.4.7000.233.28688.28684.8.463682.945039.1932988.922296.1.20
attributeSyntax: 2.5.5.1
isSingleValued: TRUE
ldapDisplayName: msExchHABRootDepartmentBL
oMSyntax: 127
objectClass: attributeSchema
linkID: 2077
mapiID: 35995 dn: CN=ms-Exch-HAB-Child-Departments-
Link,CN=Schema,CN=Configuration,DC=hab,DC=com
changetype: add
attributeID:
1.2.840.113556.1.4.7000.233.28688.28684.8.463682.945039.1932988.922296.1.12
attributeSyntax: 2.5.5.1
isSingleValued: FALSE
ldapDisplayName: msExchHABChildDepartmentsLink
isMemberOfPartialAttributeSet: FALSE
oMSyntax: 127
objectClass: attributeSchema
linkID: 2078
mapiId: 35994 dn: CN= ms-Exch-HAB-Child-Departments-
BL,CN=Schema,CN=Configuration,DC=hab,DC=com
```

```
changetype: add
attributeID:
1.2.840.113556.1.4.7000.233.28688.28684.8.463682.945039.1932988.922296.1.9
attributeSyntax: 2.5.5.1
isSingleValued: TRUE
ldapDisplayName: msExchHABChildDepartmentsBL
isMemberOfPartialAttributeSet: FALSE
oMSyntax: 127
objectClass: attributeSchema
linkID: 2079
mapiId: 35993 dn:
changetype: modify
replace: schemaUpdateNow
schemaUpdateNow: 1
-

#####Create Department class############ dn: CN=Ms-Exch-Department,CN=Schema,CN=Configuration,DC=hab,DC=com
changetype: add
defaultHidingValue: FALSE
governsID:
1.2.840.113556.1.4.7000.233.28688.28684.8.463682.945039.1932988.922296.1.2
SystemOnly: FALSE
lDAPDisplayName: msExchDepartment
objectCategory: CN=Class-Schema,CN=Schema,CN=Configuration,DC=hab,DC=com
objectClass: classSchema
objectClassCategory: 1
possSuperiors: msExchContainer
rDNAttID: cn
subClassOf: organizationalUnit
mayContain: msExchHABShowInDepartmentsBL
mayContain: msExchHABChildDepartmentsLink
mayContain: msExchHABChildDepartmentsBL
mayContain: msExchHABRootDepartmentBL dn:
changetype: modify
replace: schemaUpdateNow
schemaUpdateNow: 1
- dn: CN=Ms-Exch-Department,CN=Schema,CN=Configuration,DC=hab,DC=com
changetype: modify
add: possSuperiors
possSuperiors: msExchDepartment
- dn:
changetype: modify
replace: schemaUpdateNow
schemaUpdateNow: 1
-
```

APPENDIX B

Department Object Type

Object Type: 'Department'
Derives/Inherits from: 'Organizational Unit'
Properties:
- Display Name : single-value string
    - MAPI ID: PR_DISPLAY_NAME
- Phonetic Display Name : single-value string
    - This is used to enter a Phonetic version of the name of the department. In Japan, this phonetic name would be written in Hiragana or Katakana, while the 'name' property is in Kanji.
- Seniority Rating : single-value integer
    - This is used to allow administrators to control the sort order of Departments when they are shown in lists. In Japan, sorting the most important (or 'senior') person/department on top of lists is important.
    - The calculation of the value stored in attribute is defined by the customer. A higher number means 'more senior'. The higher the 'seniority rating' of a department is, the higher up it should appear in listings. Examples of how it will be used could be '# of years since the department was created' or 'age of most senior department member'.
- DepartmentMembers : multi-value Link
    - Points to all the users who are members of this Department.
    - This is the 'reverse pointer' of the 'IsMemberOfDepartment' attribute on the User object. This attribute is automatically kept up-to-date by the directory service.
- ParentDepartment : single-value Link
    - Points to the parent department of this department. The 'reverse pointer' of this attribute is the 'ChildDepartments' attribute.
    - This link duplicates the hierarchy information already represented by the OU containers hierarchy of departments. As Administrator tools manage the department hierarchy, they update the ParentDepartment pointer attribute whenever they add/remove child departments.
- ChildDepartments : multi-value Link
    - Points to all the departments underneath this department in the hierarchy. This is the 'reverse pointer' of the 'ParentDepartment' attribute and is kept up-to-date automatically by the directory service.
- ExOrgUsingThisAsRootDepartment : multi-value Link
    - Points to all the Organizations that use this department as the 'root department' of their HAB.
    This is the 'reverse pointer' of the 'RootDepartment' attribute and is kept up-to-date automatically by the directory service. Most departments won't have a value in this attribute since they aren't root departments to any Organization.

Clients will display members of a department in sort order according to the 'Seniority Rating' of the users. Clients may have a configuration key to sort this list according to display name instead if they decide so in designing their UI.

Using the 'Seniority Rating' for sorting of department members means it won't be possible to specify completely custom sort orders for each department since the 'Seniority Rating' is a user property which does not change depending on what department member list the user is being included in.

Additions to the Directory Service User and Contact Object Types

Add attributes to the directory service User and Contact object types:
- IsMemberOfDepartments : multi-valued Link
  - Points to the Department objects this User or Contact is a member of.
  - The 'reverse pointer' of this attribute is the 'DepartmentMembers' attribute on Department objects.
  - Use user-> departments link instead of a link in the other direction so the ACLs on the user objects to control who can add/remove users from departments. This gives customers the ability to have different administrative rights for administrators who manage the department tree, and administrators who manage what departments new/old users go into.
  This is consistent with the administrative model for Address Lists.

The directory service User and Contact objects will have a 'Seniority Rating' attribute just like the Departments. The 'Seniority Rating' on the User and Contact objects will be used to sort lists of Users/Contacts when displaying the HAB.

Additions to the Organization object type

Add attribute to the Organization object type:
- RootDepartment : single-value Link
  - This is a Legacy DN path to the root department that should show up for users in this organization. If this value is blank, the reading should use the Legacy DN for the default departmental hierarchy location described below.
  - This attribute is to support hosting scenarios.

Each hosted organization will have its own instance of the Hosted Organization object type. In hosting environments, individual users are associated with the 'Hosted Organization' objects by ensuring the "o=" part of the LegacyDN of the user object (eg. "/o=HostedOrganizationA/ou=Site/cn=Recipients/cn=TestUserA") will be the same as the LegacyDN of the 'Hosted Organization' object (eg. "/o= HostedOrganizationA").

Location of Department Hierarchy

By default the departmental hierarchy will be created in an OU (CN=All Departments) under the "CN=Address List Container" OU under the "OrganizationContainer" type object that contains all configuration for an organization. The 'All Departments' OU will be a peer to the 'All Address Lists' and 'All Global Address Lists' OUs. The root of the departmental hierarchy will be a "Department" object in that OU. The root department of the hierarchy will be labeled with a GUID LegacyDN: "/O=FF463812B-D8AE-406c-B8E6-BC1A22A4C69E" (this GUID was randomly generated to function as an identifier).

Clients will use the 'RootDepartment' attribute from the Organization object associated with a user to determine what "Department" object to show as the root of the hierarchy for that user. If the 'RootDepartment' attribute on the user object has no value, they will use the LegacyDN GUID to find the default department hierarchy root.

Department Hierarchy Access Rights

By default two sets of users/groups will be set up with access to the Departmental Hierarchy:
- "Mail Servers" (including all Mail Server machine accounts) will have full access to the 'CN=Departments' OU and all Department objects underneath it.
    o The Administrator Tools will use the machine account (LocalSystem) on Mail Servers as the service account to read/write the Department hierarchy.
- "Everyone" will have read access to the 'CN=Departments' OU and all Department objects underneath it.

See the 'Delegation' section below for details about how to allow certain sets of people to control certain sub-sections of the Department Tree.

Client Access to Departments

Clients will access the Departmental Hierarchy through NSPI using the DT_ORGANIZATION MAPI display type which is already mapped to the OU type. Clients will be able to use existing NSPI calls to request the properties of Department objects, and to enumerate the sub-Departments contained within a Department. Clients will be able to read the Department hierarchy one level at a time, and will not be limited to the Address List behavior of reading the whole tree in one transfer.

Clients will only read from the Departmental Hierarchy, never write to it.

Performance and Size Limitations

The size limits for the Departmental Hierarchy are set to avoid serious performance issues with the directory service, clients and email servers. They will be enforced in administrative tools available to manage the Departmental Hierarchy.

When customers auto-populate the Departmental Hierarchy from some other DB, these limits won't be enforced. For that scenario, the following are recommended max limits for the Departmental Hierarchy, and going beyond these limits may have an unpredictable performance impact on the directory service, clients and email servers.
- Max depth: 15.
- Max # of Department objects in one tree: 20.000
- Max users in one department: 2.000

Administration of the Departmental Hierarchy

The following tools and documentation to make it possible to administer the Departmental Hierarchy:
- Guidelines for how to replicate an existing Departmental Hierarchy in some other database into the directory service.
    o A special case of auto-populating the Departmental Hierarchy by converting the existing Reporting Line hierarchy into a Departmental Hierarchy by creating a department for each manager.
    o Another special case of replicating the hierarchy (including user membership) between user and resource forests.
- A Graphical User Interface tool where administrators can create/delete/rename/move Departments in the tree and manage what users are listed in what departments.

Delegation

There are two types of HAB rights that can be delegated independently:
- The right to create/rename/delete departments in some sub-section of the department tree.
    - Delegation of this right will be controlled through 'extended ACLs' which are not interpreted by the directory service, but by the HAB Administrator tools. The HAB Administrator tools will be executing all department create/modify code using a service account which is part of the 'Mail Servers' group. The Administrator Tools will write the 'extended ACLs' which control what users have the right to create/modify departments in certain parts of the tree. The Administrator Tools will also be enforcing these 'extended ACLs' to ensure only the users who have been given permission to create/modify departments in a certain section of the tree can do so.
        - This extended ACL will mean "These users have the right to modify this department object, and to create sub-department objects. They can also modify the whole department tree under this department object in the same way".
        - As new departments are created, their extended ACL will be empty, meaning that they inherit all the permissions from the ext. ACL of their parent department. If a user is added to the extended ACL of a sub-department, all the right specified in the parent department ext. ACL still apply to the sub-department in addition to the extended ACL set on the sub-department itself.
    - To control delegation access for department management, an intermediate service (eg. web service) authenticates the user and then enforces custom access rights for department create/rename/delete in different parts of the department tree.
- The right to control what departments contain what users.
    - As per the explanation above, anyone with write access to the 'IsMemberOfDepartments' attribute on the directory service user objects will be able to place those objects in any department.
        - The Administrator tools will make the membership-management calls to the directory service using the user account of the person actually doing the administration, instead of the service account used to create/modify department objects.
        - If the right is updated to "Administrator can only add the users they control to departments they control" another extended ACL is added on the department objects which would say "These users have the right to add users to this department". That extended ACL is enforced by the Administrator tools and is not enforced by the directory service.

What is claimed is:

1. A system for a hierarchical address book for two or more organizations, said system comprising:
   a memory area for storing, for each of the two or more organizations:
   a plurality of user objects, said user objects each representing an employee in one of the organizations, each of said plurality of user objects having contact information and a seniority rating associated therewith; and
   a hierarchy of department objects, said department objects each representing a department in the organization and having a user field for storing a reference to one or more of the user objects, each of the referenced one or more user objects further having a reference to a root department object of the hierarchy associated therewith and representing an employee in the department represented by the department object, the root department object representing a highest department of the hierarchy,
   wherein the department object comprises a parent field for storing a reference to one of the department objects that is one level higher than the particular department object in the hierarchy and a child field for storing a reference to one or more of the department objects that are one level subordinate to the particular department object in the hierarchy, said department object further comprising a seniority field for storing a value representing the seniority of the department; and
   a processor configured to execute computer-executable instructions for:
   selecting the hierarchy of department objects of one of the two or more organizations based on the referenced root department object of the user object of a user of the system;
   displaying at least a portion of the selected hierarchy of department objects to the user;
   receiving a selection from the user of at least one of the displayed department objects;
   identifying the one or more of the user objects referenced in the user field of the selected department object;
   displaying the contact information associated with each of the identified one or more of the user objects;
   receiving a selection from the user comprising a plurality of the displayed user objects and at least one department object; and
   addressing an electronic message to the employees represented by the selected plurality of user objects and to the represented department of the selected at least one department object, said addressing further comprising listing the employees represented by the selected plurality of user objects and the represented department of the selected at least one department object in an order based on the seniority field of the selected at least one department object and on the seniority rating associated with each selected user object.

2. The system of claim 1, wherein the processor is further configured to execute computer-executable instructions for sending the addressed electronic message to each of the employees represented by the selected plurality of user objects, to each employee represented by the one or more of the user objects referenced in the user field associated with the selected at least one department object, and to the employees associated with the department objects referenced in the child field of the selected at least one department object.

3. The system of claim 1, wherein the addressed electronic message relates to the assignment of an access right to each of the employees represented by the selected plurality of user objects.

4. The system of claim 1, wherein the value of the seniority field of the department is a function of at least one of the following: a number of years since the department was created and an age of the most senior department employee.

5. The system of claim 1, wherein the hierarchy of department objects and the plurality of user objects for each organization are synchronized with a reporting line hierarchy maintained by another system within the organization.

6. In a computer system having a graphical user interface including a display and a user interface selection device, a method of ordering a list of recipients of an electronic mail message for an organization, said method comprising:
   receiving, from a user via the user interface selection device, a list of recipients of an electronic mail message specifying at least one employee and at least one department of the organization;
   accessing a list of user nodes each representing an employee of the organization, each of the user nodes having an employee seniority rating representing a seniority of the employee represented by the user node, said accessing the list of user nodes further comprising determining the employee seniority rating of the specified employee via the user node corresponding to the specified employee;
   accessing a hierarchy of department nodes each representing a department in the organization, each of the department nodes having a department seniority rating representing a seniority of the department represented by the department node, said accessing the hierarchy of department nodes comprising determining the department seniority rating of the specified department via the department node corresponding to the specified department;
   ordering the received list of recipients based on the determined employee seniority rating of the specified employee and the determined department seniority rating of the specified department; and
   displaying, on the display, the ordered list of recipients in the electronic mail message.

7. The method of claim 6, wherein ordering the received list of recipients comprises ordering the received list of recipients in decreasing order of seniority.

8. The method of claim 6, wherein the seniority of the employee is a function of one or more of the following: a number of years of service of the employee, an age of the employee, an experience level of the employee, an education level of the employee, and a merit of the employee.

9. The method of claim 6, wherein the seniority of the department is a function of one or more of the following: a number of years since the department was created, and an age of the most senior department employee.

10. The method of claim 6, further comprising tracking and maintaining the seniority ratings of the department nodes and user nodes.

11. The method of claim 6, wherein one or more computer-readable storage media have computer-executable instructions for performing the method of claim 7.

12. One or more computer-readable storage media having computer-executable components comprising:
   an address book component for providing, for each of a plurality of organizations, a hierarchy of department objects and a plurality of user objects, each of the department objects representing a department in an organization, each of the department objects having a user field for storing a reference to one or more of the user objects and a seniority field for storing a value representing the seniority of the department, each of the referenced one or more user objects further having a reference to a root department object of the hierarchy associated therewith, said root department object representing a highest department of the hierarchy, said referenced user object representing an employee in the department represented by the department object and having a seniority rating, said seniority rating representing a seniority of the employee represented by the user object;

a synchronization component for updating the hierarchy of department objects and the plurality of user objects provided by the address book component with a reporting line hierarchy maintained in a memory area accessible to the synchronization component for each of the plurality of organizations; and an electronic mail component for integrating electronic messaging with the hierarchy of department objects and the plurality of user objects provided by the address book component, wherein the address book component performs the steps of:

selecting one of the plurality of organizations based on the referenced root department object of the user object of a user;

receiving a list of recipients for an electronic message from the user specifying at least one employee and at least one department of the selected organization;

accessing user objects corresponding to the specified at least one employee, said accessing the user objects further comprising determining the seniority rating of each of the specified at least one employee;

accessing department objects corresponding to the specified at least one department, said accessing the department objects further comprising determining the seniority field of each of the specified at least one department;

ordering the list of recipients based on the seniority ratings of the specified at least one employee and the seniority fields of the specified at least one department; and addressing the electronic message to the ordered list of recipients.

13. The computer-readable storage media of claim 12, wherein the address book component includes a graphical user interface for displaying the hierarchy of department objects and plurality of user objects of the selected organization to the user, said graphical user interface comprising:

a list view display displaying the user objects, wherein at least one of the user objects is highlighted in the list view display; and a tree view display including a department pane and a user pane, said department pane displaying the department objects in hierarchical order, wherein the department object associated with the user object highlighted in the list view display is highlighted in the department pane, said user pane displaying the user objects of the highlighted department object, wherein the user object highlighted in the list view display is highlighted in the user pane.

14. The computer-readable storage media of claim 12, wherein the address book component includes a graphical user interface for displaying the hierarchy of department objects to a user, said graphical user interface comprising a tree view display displaying the department objects in hierarchical order, wherein a user-configurable default department object is highlighted in the tree view display.

15. The computer-readable storage media of claim 14, wherein a particular department object comprises:

a parent field for storing a reference to one of the department objects that is one level higher than the particular department object in the hierarchy; and a child field for storing a reference to one or more of the department objects that are one level subordinate to the particular department object in the hierarchy, wherein the electronic message is addressed to the employees represented by a selected plurality of user objects, to the employees represented by one or more of the user objects referenced in a user field associated with the selected department object, and to the employees of the department objects referenced in a child field based on the contact information and the seniority rating associated with each selected user object wherein the employees are listed in order of seniority rating in said electronic message.

* * * * *

UNITED STATES PATENT AND TRADEMARK OFFICE
CERTIFICATE OF CORRECTION

PATENT NO.       : 7,617,243 B2                                   Page 1 of 1
APPLICATION NO. : 11/439803
DATED            : November 10, 2009
INVENTOR(S)      : Ramanathan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 401 days.

Signed and Sealed this

Nineteenth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,617,243 B2 | |
| APPLICATION NO. | : 11/439803 | |
| DATED | : November 10, 2009 | |
| INVENTOR(S) | : Rajesh Ramanathan et al. | |

It is certified that error appears in the above-identified patent and that said Letters Patent is hereby corrected as shown below:

In column 28, line 19, in Claim 6, delete "specifving" and insert -- specifying --, therefor.

In column 28, line 61, in Claim 11, delete "7." and insert -- 6. --, therefor.

Signed and Sealed this
Twenty-second Day of February, 2011

David J. Kappos
*Director of the United States Patent and Trademark Office*